United States Patent [19]
Kittle

[11] 3,973,398
[45] Aug. 10, 1976

[54] HYDRAULIC SYSTEM AND AUTOMATICALLY SHIFTABLE DIRECTION CONTROL VALVE THEREFOR

[75] Inventor: Carl Edwin Kittle, Cedar Falls, Iowa

[73] Assignee: Deere & Company, Moline, Ill.

[22] Filed: Sept. 12, 1975

[21] Appl. No.: 612,632

[52] U.S. Cl. ............................. 60/427; 60/456; 60/484; 60/486; 91/414; 137/597
[51] Int. Cl.² ..................................... F15B 11/16
[58] Field of Search ............ 60/427, 464, 456, 484, 60/486; 91/414; 137/597

[56] References Cited
UNITED STATES PATENTS
3,543,516   12/1970   Treichel............................ 60/427 X Primary Examiner—Edgar W. Geoghegan

[57] ABSTRACT

An improved automatically shiftable direction control valve for a tractor hydraulic system wherein there is provided a charging pump, low pressure priority functions such as cooling and lubrication connected to the charging pump, a main pump, a continuously acting reversible function, a single-acting function, and a double-acting function all connected to the output of the main pump, and a manually operable direction control valve for each of the functions. The improved automatically shiftable direction control valve has a restricted passage causing a pressure drop which shifts the valve so as to direct the exhaust of the continuously-acting and double-acting functions to the charging circuit and to direct the exhaust of the single-acting function to the fluid reservoir.

9 Claims, 3 Drawing Figures

HYDRAULIC SYSTEM AND AUTOMATICALLY SHIFTABLE DIRECTION CONTROL VALVE THEREFOR

BACKGROUND OF THE INVENTION

The present invention relates to an automatically shiftable direction control valve for use with a tractor hydraulic system and more specifically relates to improvement in the hydraulic system and automatically shiftable direction control valve disclosed and claimed in the U.S. Pat. No. 3,543,516 granted to R. Treichel on Dec. 1, 1970.

The above-mentioned prior art patent discloses a direction control valve which is operative to automatically direct the exhaust of a single-acting function to the fluid reservoir and to direct the exhaust of continuously-acting or double-acting functions to a charging circuit for the main pump by blocking the exhaust from the reservoir and causing it to back up through a check valve into the charging circuit.

The disadvantage of the prior art is that a check valve is required and that it may hang up thus causing continuous feed of fluid in the charging circuit directly to reservoir resulting in there being insufficient fluid available to the main pump and to the low pressure priority functions.

SUMMARY OF THE INVENTION

According to the present invention, there is provided an improved hydraulic system and direction control valve which is operative to automatically connect the exhaust of the single-acting function to the fluid reservoir and to connect the exhaust of continuously-acting or double-acting functions to the charging circuit so that there is always sufficient oil in the charging circuit to operate certain low priority functions pressurized thereby during operation of the continuously-acting or double-acting functions.

The above and additional advantages of the present invention will become apparent to those skilled in the art from a consideration of the following detailed description of the preferred embodiment when taken in conjunction with the accompanying drawings.

DESCRIPTION OF THE PREFERRED EMBODIMENT

Figure 1:
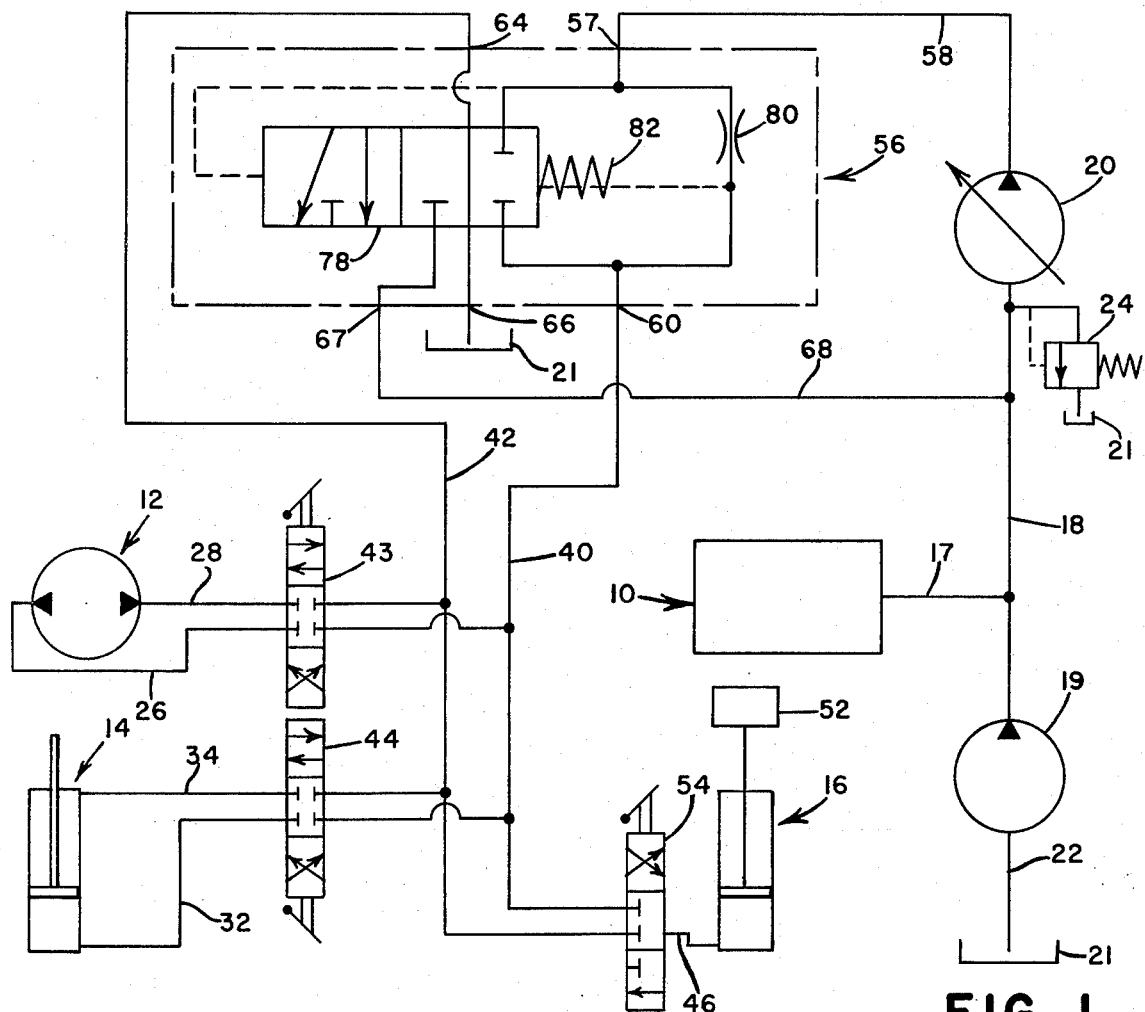
FIG. 1 is a schematic illustration of the tractor hydraulic system in which the present system is embodied.

In FIG. 1 is a schematic illustration of a tractor hydraulic system which includes, by way of example, four different types of functions, namely a low pressure priority function 10 such as a system for supplying oil for cooling and lubricating the tractor transmission and engine, a continuously-acting function 12, a double-acting function 14, and a single-acting function 16.

The priority function 10 is connected by means of a conduit 17 to a charging circuit line 18 which connects the output side of a charging pump 19 with the input side of a main pump 20. The input side of the charging pump 19 is connected to a fluid reservoir 21 by means of a conduit 22. A relief valve 24 is disposed in the line 18 and operates to connect the line 18 to reservoir 21 when charging pressure exceeds a predetermined value.

The continuously-acting function 12 is representative of a reversible hydraulic motor having alternate inlet conduits 26 and 28 and the double-acting function 14 is represented as a two-way cylinder having alternate inlets 32 and 34. The alternate inlets of the functions 12 and 14 are respectively and selectively connectible to a pressurized fluid feed line 40 or a fluid exhaust line 42 by means of similar manually actuated direction control valves 43 and 44, each of which has a central position wherein fluid flow is blocked from and to the feed and exhaust lines 40 and 42, a position to one side of the central position wherein the respective function inlet conduits 26 and 32 are connected to the feed line 40 and their respective inlet conduits 28 and 34 are connected to the exhaust line 42, and a position to the other side of the central position wherein the respective function inlet conduits 28 and 34 are connected to the feed line 40 and the inlet conduits 26 and 32 are connected to the exhaust line 42.

The single-acting function 16, represented as a one-way hydraulic cylinder having a single inlet conduit 46, is actuable to move a load represented by the box 52. A manually operated direction control valve 54 is movable from a central position wherein fluid flow to and from the function 16 is blocked, to a position on one side of the central position wherein the inlet conduit 46 is connected to the feed line 40, and to a position on the other side of the central position wherein the inlet conduit 46 is connected to the exhaust line 42.

An automatic direction control valve 56 has a first inlet port 57 connected to the output side of the main pump 20 by means of a conduit 58 and a first outlet port 60 connected to the feed line 40. The exhaust line 42 is connected to a second inlet port 64 in the valve 56. The control valve 56 has a second outlet port 66 connected to the reservoir 21 and a third outlet port 67 connected by a line 68 to the charging circuit line 18 between the charging and main pumps 19 and 20, respectively.

Figure 2:
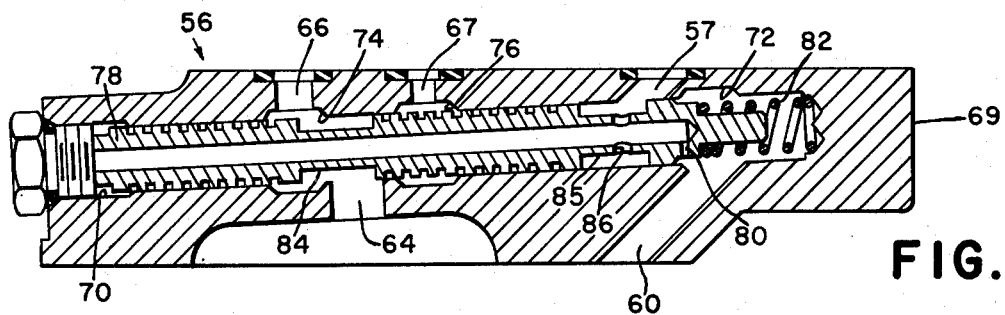
FIG. 2 is an axial section of the direction control valve shown in its normal position wherein it connects the exhaust of a single acting function to the reservoir.
Figure 3:
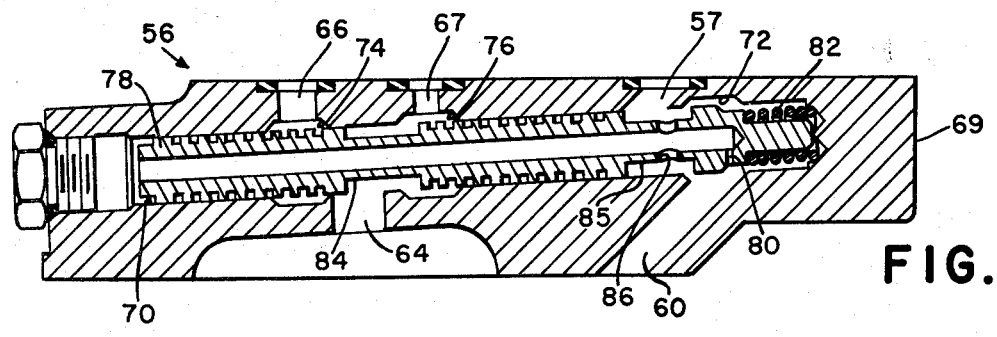
FIG. 3 is a section similar to FIG. 2 but showing the valve shifted to its alternate position wherein it directs the exhaust of continuously-acting or double-acting functions to the charging circuit.

The automatic direction control valve 56 is shown in detail in FIGS. 2 and 3. It includes a valve body 69 having therein generally cylindrical bore 70. At axially spaced positions on opposite sides of and intersecting the bore 70 are the first inlet and outlet ports 57 and 60, and the second inlet port 64 and the second and third outlet ports 66 and 67. The first, second and third outlet ports 60, 66, and 67 open into annular grooves 72, 74, and 76, respectively, formed in the bore 70.

Positioned within the bore 70 for axial shifting therein is a generally hollow valve member 78 which has a restricted passage or radial orifice 80 formed in its right end. The valve member 78 is normally held in a first position, shown in FIG. 2, by a compression spring 82 acting between the right end of the valve member 78 and the valve body 69 so that the left end of the valve member 78 bears against the left end of the valve body 69. An annular groove 84 formed in the valve member 78 joins the second inlet port 64 to the annular groove 74 when the valve member 78 is in the first position. The valve member 78 is shiftable to the right against the bias of the spring 82 to a second position, shown in FIG. 3, wherein the annular groove 84 no longer joins the second inlet port 64 and the annular groove 74, but rather joins the second inlet port 64 to the annular groove 76. An annular groove 85 formed in the valve member 78 joins the first inlet port 57 to the annular groove 72 when the valve member 78 is in the second position. A plurality of radial ports 86 extend through the tubular valve member 78 connecting the interior of the valve member 78 to the annular groove 85 and thence to the annular groove 72 only in the second position of the valve member 78, thereby bypassing the orifice 80.

In operation, assuming that the feed line 40 is fully pressurized, and the manually operated direction control valves 43, 44, and 54 are each in their central positions as illustrated in FIG. 1, the pressure across the control valve 56 will be balanced and the control valve member 78 will be in the position shown in FIG. 2, wherein flow from the first inlet port 57 to the first outlet port 60 is permitted only through the orifice 80 to the feed line 40. In this position, the annular groove 84 interconnects the second inlet port 64 to the annular groove 74 and thence to the second outlet port 66 so that the exhaust line 42 is connected to the fluid reservoir 21.

If either of the manually operated direction control valves 43 and 44, associated respectively with the functions 12 and 14, is shifted so as to connect one of the respective inlets to the feed line 40 and the other of the respective inlets to the exhaust line 42, flow through the ports 86 initially passes only through the orifice 80 resulting in a pressure drop across the left and right ends of the valve member 78 which causes the valve member 78 to shift to the right to the position illustrated in FIG. 3 due to a greater pressure at the left end of the valve member 78 than at the right end. In this second operative position, flow to feed line 40 is permitted through the first inlet port 57, the annular groove 85, the annular groove 72, and to the first outlet port 60. Further, exhaust flow from the functions 12 or 14 flows through the exhaust line 42, into the second inlet port 64, through annular grooves 84 and 76, the third outlet port 67, and the line 68 to the charging circuit line 18. The recirculation of the exhaust fluid relieves the charging pump of almost all of the demand of the main pump so that nearly the entire output of the charging pump is available for the low pressure priority functions such as lubrication and cooling. This permits a charging pump to be selected which has a maximum capacity of just slightly more than necessary for adequately supplying the low pressure function.

If instead of the functions 12 and 14 being operated, the single-acting function 16 is operated to lift the load 52, the manually operated direction control valve 54 is shifted to the position wherein the feed line 40 is connected to the inlet conduit 46. Again the initial flow through the radial ports 86 and the orifice 80 will cause a pressure drop across the valve member 78, causing the valve member 78 to assume the second position shown in FIG. 3. The second position allows relatively unrestricted flow into the feed line 40 through the annular groove 85. There, of course, would be no flow into the return line 42. If it is desired to lower the load 52, the direction control valve 54 is shifted to the position where the inlet conduit 46 is connected to the return line 42. Since, in this case, there is no flow through the valve member 78, there is no pressure drop to shift the valve member 78 to the right, and the valve member 78 remains in the position shown in FIGS. 1 and 2, wherein fluid in the return line 42 is permitted to flow to the fluid return reservoir 21 via the ports 64 and 66, thus permitting the load 52 to lower freely.

It is also to be noted that malfunctions and the operation of the control valve 56 will not cause a loss in the exhaust fluid resulting in insufficient fluid being available for the priority functions 10. For example, assuming that there is a failure in the compression spring 82, the valve member 78 would tend to shift to the right causing exhaust fluid in the line 42 to flow to the charging circuit line 18 to prevent an inadequacy in the amount of oil available for the priority function 10. Assuming that the ports 86 remain unblocked, this would hinder only operation of the single acting function in the load lowering portion of the cycle. Another example would be if the valve member 78 was to stick. Sticking in the second position would again result in the line 42 being connected to the charging circuit line 18. If the valve member 78 were to stick in the first position wherein the exhaust line 18 is connected to the fluid reservoir 21, insufficient flow would be allowed through the orifice 80 in the valve member 78 to operate any of the functions 12, 14, or 16 and thus the exhaust fluid lost would be minimal.

It is to be understood that the action of the automatic direction control valve 56 is described only as a matter of convenience with reference to being in a circuit where the continuously acting, double acting, and single acting functions are operated selectively and that where it is desirable to operate the functions simultaneously, a separate automatic direction control valve may be provided for at least the single-acting function in order that the single-acting function will not have to lower against the charging circuit pressure as would be the case with respect to the illustrated circuit.

While the invention has been described in conjunction with a specific embodiment, it is to be understood that many alternatives, modifications, and variations will be apparent to those skilled in the art in light of the aforegoing description. Accordingly, it is intended to embrace all such alternatives, modifications and variations which fall within the spirit and scope of the appended claims.

I claim:

1. In a tractor hydraulic system including a reservoir, a charging pump supplied by the reservoir, a priority function such as that for cooling or lubricating the tractor transmission, a main pump, conduit means connecting the outlet side of said charging pump to the priority function and to the inlet side of the main pump, at least one function having pressure and exhaust ports, a single-acting function, direction control valve means for controlling selective operation of said one function and of said single-acting function and including pressure and exhaust ports, supply conduit means connecting the outlet of the main pump to each of the pressure ports of the direction control valve means and a return conduit means connected to each of the exhaust ports of said direction control valve means, the improvement comprising: valve means operatively connected in said supply and return conduit means and to said conduit means and including valve member means being shiftable, in response to the single-acting function being exhausted, to a first operative position wherein fluid flow is permitted through the return conduit means to the reservoir and being shiftable, in response to the one function being operated, to a second operative position wherein fluid flow in the return conduit is permitted through said valve means to said conduit means.

2. The invention as defined in claim 1 wherein said valve means includes a bore having first inlet and outlet ports for delivering fluid in the supply conduit means from said main pump to said one and single-acting functions and having second inlet and second and third outlet ports for delivering fluid in said return conduit means from the exhaust of said one and single acting functions to the reservoir and to said conduit means, said valve member means being positioned within said bore for axial shifting movement between the various ports, bias means normally holding said valve member means in said first operative position, said valve member means having a restricted passage permitting flow between said first inlet and outlet ports and causing a pressure drop for automatically shifting said valve member means against the bias means to said second operative position when said one function is operated, said valve member means having bypass means therein for selectively allowing flow between said first inlet and outlet ports and means cooperating between said valve member means and said bore for blocking flow from said bypass means and allowing flow between said second inlet and outlet ports when said valve member means is in said first operative position and for allowing flow between said first inlet and outlet ports and between said second inlet and third outlet ports when said valve member means is in said second operative position.

3. The invention as defined in claim 2 wherein the valve member means is hollow and said bypass means includes fluid passage means formed in said valve member and wherein the means cooperating between the valve member means and the bore includes fluid passage means formed in said bore for communication with said fluid passage means formed in said valve member only when said valve member means is in said second operative position, and further fluid passage means formed in said valve member for communication with said second inlet and outlet ports only when said valve member is in said first operative position and for communication with said second inlet and said third outlet ports only when said valve member is in said second operative position.

4. A valve assembly for use in a hydraulic system where it is desirable to control the direction of flow in one fluid circuit according to fluid flow in another fluid circuit comprising: a valve body having first inlet and outlet ports for carrying fluid in a first fluid circuit and second inlet and outlet ports for carrying fluids in a second fluid circuit and said second inlet and a third outlet ports for connecting the first and second fluid circuits; valve means in said valve body operatively associated with the inlet and outlet ports and shiftable from a first operative position corresponding to a first rate of flow in said first fluid circuit wherein restricted flow is permitted between said first inlet and outlet ports while simultaneously permitting flow through said second inlet and outlet ports to a second operative position in response to a second rate of flow in said first circuit which is a predetermined amount greater than said first rate of flow wherein a relatively unrestricted flow is permitted between said first inlet and outlet ports while flow is simultaneously permitted through said second inlet and third outlet ports.

5. The invention defined in claim 4 wherein the valve means includes a generally cylindrical bore in fluid communication with said inlet and outlet ports and a valve member positioned within said bore for axial shifting movement among said ports, bias means normally holding said valve member in said first operative position, said valve member having a restricted passage permitting restricted flow between said first inlet and outlet port and causing a pressure drop for automatically shifting said valve member against the bias means to said second operative position when said second rate of flow is occurring in the first fluid circuit, said valve member having bypass means therein for selectively allowing flow between said first inlet and outlet ports and means co-operating between the valve member and the bore for blocking flow from said bypass means and for allowing flow through the second inlet and outlet ports when the valve member is in the first operative position and through the second inlet and third outlet ports when the valve member is in the second operative position.

6. The invention defined in claim 5 wherein said valve member is hollow and said bypass means includes fluid passage means formed in the valve member and wherein the means cooperating between the valve member and the bore includes fluid passage means formed in said bore for communication with said fluid passage means formed in the valve member only when said valve member is in said second operative position and further fluid passage means formed in the valve member for communication with said second inlet and outlet port only when said valve member is in said first operative position and for communication with said second inlet and third outlet ports only when said valve member is in said second operative position.

7. A tractor hydraulic system comprising: a charging pump having an associated reservoir; a charging circuit including at least one low priority function connected to the charging pump; a main pump connected to the charging circuit; at least one function having pressure and exhaust ports; a single-acting function; direction control valve means for controlling selective operation of said one and single-acting functions and including pressure and exhaust ports; valve means having first inlet and outlet ports respectively connected to the main pump and to the pressure ports of the direction control valve means and having second inlet and second outlet and third outlet ports respectively connected to the exhaust ports of the direction control valve means, to the reservoir, and to the charging circuit; said valve means including a valve member operatively associated with the inlet and outlet ports and being responsive to a no-flow condition through said first inlet and outlet ports, as when said single-acting function is operated to exhaust, to allow flow through the second inlet and outlet ports to the reservoir and being responsive to a flow condition through said first inlet and outlet ports, as when said one function is being operated, to allow flow through the second inlet and third outlet ports to the charging circuit allowing exhaust flow into the charging circuit.

8. The invention defined in claim 7 wherein the valve means includes a generally cylindrical bore in fluid communication with said inlet and outlet ports and said valve member being positioned within said bore for axial shifting movement among said ports; bias means normally holding said valve member in said first operative position; said valve member having a restricted passage allowing restricted flow between said first inlet and outlet ports and causing a pressure drop in said flow condition to automatically shift said valve member against the bias means to said second operative position; said valve member having a bypass port for selectively permitting flow between said first inlet and outlet ports; and means cooperating between the valve member and the bore for blocking flow from said bypass port when the valve member is in the first operative position and for permitting flow through the second inlet and third outlet ports when the valve member is in the second operative position.

9. The invention defined in claim 8 wherein the valve member is hollow and said bypass port includes fluid passage means formed in the valve member and wherein the means cooperating between the valve member and bore includes a fluid passage means formed in the bore for communication with said fluid passage means formed in the valve member only when said valve member is in said second operative position and further fluid passage means formed in the valve member for communication with second inlet and outlet ports only when said valve member is in said first operative position and with said second inlet and third outlet ports only when said valve member is in said second operative position.

* * * * *